(12) United States Patent
Jowett

(10) Patent No.: US 7,022,222 B2
(45) Date of Patent: *Apr. 4, 2006

(54) IN-PIPE WASTEWATER TREATMENT SYSTEM

(76) Inventor: E. Craig Jowett, 177 Cobblestone Place, Box 385, Rockwood, Ontario (CA) N0B 2K0

(*) Notice: Subject to any disclaimer, the term of this patent is extended or adjusted under 35 U.S.C. 154(b) by 0 days.

This patent is subject to a terminal disclaimer.

(21) Appl. No.: 10/846,831

(22) Filed: May 17, 2004

(65) Prior Publication Data

US 2004/0256297 A1    Dec. 23, 2004

Related U.S. Application Data

(63) Continuation of application No. 10/077,846, filed on Feb. 20, 2002, now Pat. No. 6,749,745.

(30) Foreign Application Priority Data

Feb. 26, 2001 (GB) ................................... 0104693
Oct. 22, 2001 (GB) ................................... 0125266

(51) Int. Cl.
    *C02F 3/28* (2006.01)
(52) U.S. Cl. ................ 210/151; 210/170; 210/532.2
(58) Field of Classification Search ................ 210/150, 210/151, 170, 253, 255, 299, 532.2, 615, 210/617, 747
See application file for complete search history.

(56) References Cited

U.S. PATENT DOCUMENTS

| | | | |
|---|---|---|---|
| 1,638,869 A * | 8/1927 | Moss | 210/532.2 |
| 1,660,697 A * | 2/1928 | Webb | 210/532.2 |
| 1,832,967 A | 11/1931 | Craig | |
| 3,407,608 A | 10/1968 | Whitehead | |
| 3,826,742 A * | 7/1974 | Kirk et al. | 210/150 |
| 4,039,437 A * | 8/1977 | Smith et al. | 210/150 |
| 4,218,318 A * | 8/1980 | Niimi et al. | 210/150 |
| 4,721,408 A | 1/1988 | Hewlett | |
| 5,083,885 A | 1/1992 | Ushitora et al. | |
| 5,160,039 A * | 11/1992 | Colburn | 210/150 |
| 5,322,387 A | 6/1994 | Heine et al. | |
| 5,344,557 A * | 9/1994 | Scanzillo | 210/170 |
| 5,510,032 A | 4/1996 | Vail et al. | |
| 5,810,509 A | 9/1998 | Nahlik, Jr. | |
| 5,823,711 A | 10/1998 | Herd et al. | |
| 5,895,569 A | 4/1999 | Connelly | |
| 5,980,739 A | 11/1999 | Jowett et al. | |
| 6,153,094 A | 11/2000 | Jowett et al. | |
| 6,325,923 B1 * | 12/2001 | Zaluski et al. | 210/150 |
| 6,383,372 B1 | 5/2002 | Houck et al. | |
| 6,440,304 B1 | 8/2002 | Houck et al. | |
| 6,482,319 B1 | 11/2002 | Houck et al. | |

FOREIGN PATENT DOCUMENTS

EP    0 741 111    11/1996

* cited by examiner

*Primary Examiner*—Christopher Upton
(74) *Attorney, Agent, or Firm*—Anthony Asquith Corp.

(57) ABSTRACT

In place of a conventional septic tank, wastewater undergoes anaerobic treatment and settlement in a treatment-pipe. The treatment-pipe has a long/narrow configuration. End chambers provide inlet and outlet ports, a sump for collecting settled-out solids, and sealing attachments for the treatment-pipe itself.

28 Claims, 3 Drawing Sheets

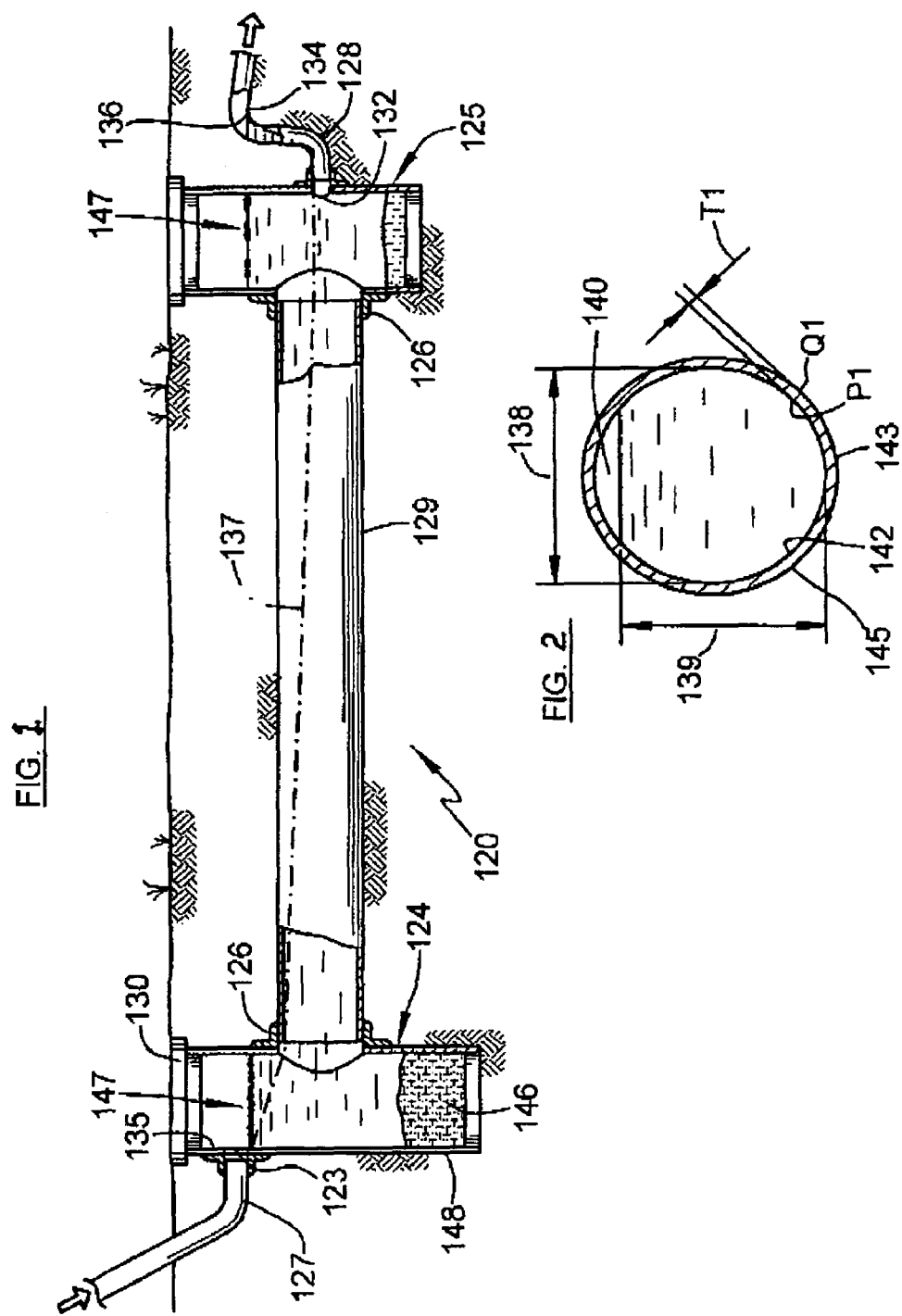

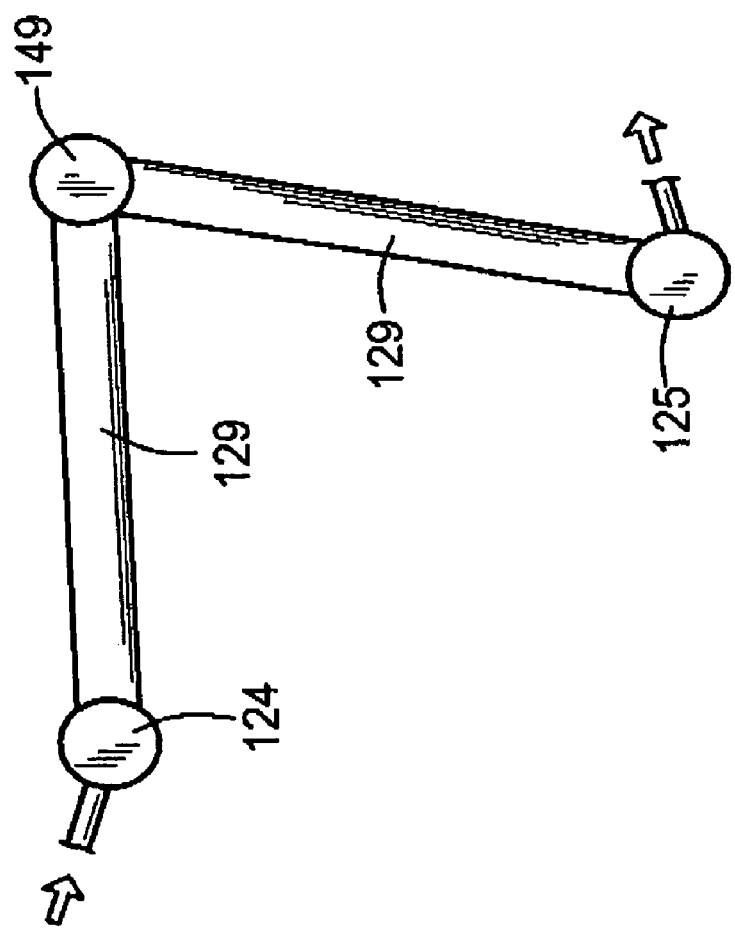

IN-PIPE WASTEWATER TREATMENT SYSTEM

This invention relates to the treatment of wastewater, being wastewater e.g from a domestic dwelling, and relates especially to the treatment of wastewater as has been traditionally carried out in a septic tank.

Septic tanks have been well known for many years, and many designs have been proposed, ranging from the simple hollow rectangular box-shaped tank, to more intricate and sophisticated designs, in which separate compartments, baffles, and the like, have been used. These sophistications have been aimed at making sure the septic tank performs properly, in the sense that no water can emerge untreated from the tank, and at making sure the septic tank performs efficiently, in the sense that the septic tank performs its functions using a minimum of volume and space.

The traditional septic tanks have been made of concrete, metal, plastic, etc. The material has to be watertight, and must remain so for many years, and has to withstand the stresses arising from settling of the ground, from overloading and other abuses, and the like. Septic tanks have been designed with access hatches, whereby a person can inspect the interior and monitor the build-up of sludge and scum, and through which the sludge/scum can be extracted from time to time.

The invention is concerned with achieving the performance of a traditional septic tank, including promoting the anaerobic digestion reactions, separating sludge and scum from the water by settling, etc, but with achieving this performance in an apparatus that is of a more convenient and efficient configuration and size. One of the aims of the invention is to make it easier to find room for the apparatus, and to make less expensive the task of installing the apparatus, than has been the case with the traditional septic tank designs, and to allow easy installation in areas of high water table or high bedrock.

In one preferred embodiment, the septic tank is basically configured in the form of a long, narrow, pipe. The pipe may be of extruded plastic, having a diameter typically of fifty or sixty centimetres, and being four or more metres long. Such pipes are readily and inexpensively available. They are intended for commercially conveying water, including wastewater, and are intended to be buried in the ground. These relatively small diameter extruded plastic pipes are light in weight, whereby two persons can easily lift a length of the pipe down from a truck, manhandle it, and install it in an easily-prepared shallow trench, in the ground. The invention lies in configuring a structure such as a pipe of this kind, as a septic tank.

As mentioned, rectangular concrete septic tanks are traditional and well known, as are metal tanks. Both are readily available, with or without internal baffles. However, both these materials deteriorate in sewage, especially where sulphur is present. Also, septic tanks made of plastic are known. In particular, it is known to provide a septic tank in the form of a round plastic body, typically about one and a half metres in diameter, and two or three metres long. Theoretically, this body could be extruded, like a pipe, but a more favoured manner of construction is to fabricate the body over a mould, in, for example, glass-fibre-reinforced plastic. Similarly-fabricated plastic end-caps are cemented onto the ends of the round body, prior to installation in the ground. Hatches, ports, etc, have been included in the as-fabricated structures.

The known moulded-plastic septic tanks have been lighter in weight than the comparable concrete tank. However, when the tank is pumped out during service, or if the water table should rise, a tank made of plastic might be prone to flotation. Polyethylene and fibreglass tanks have improved chemical resistance. Fibreglass tanks are very expensive. Polyethylene tanks are not so durable, and can collapse if not installed and backfilled with unusual skill and care. Also, the known plastic tanks still take up more or less the same size of hole in the ground, so there is little saving of space, or of amount of excavation. Also, although the plastic tank is lighter, still a crane is needed to lift the plastic tank off the truck, move the tank to the prepared (excavated) hole, and lower the tank into the hole. As a result, the savings overall, arising from the use of a plastic tank, are marginal.

As mentioned, it is known to incorporate baffles into a concrete or metal tank. The baffles create mechanically-defined pathways along which the water passes. Without the baffles, a wide conduit would be available for the water flow. The tendency is, when the conduit is wide, not for the water to flow at an even rate over the whole cross-sectional area of the wide conduit, but for the water to start to establish unwanted pathways. It has been recognised that, in a case where the water can pass rapidly along a pathway that has developed, from inlet to outlet, the volume of the tank is not being used efficiently. Some of the water, i.e the water in the pathway, now has a short residence time, the rest much longer.

Only when the residence time of all the water is the same is the volume of the septic tank being used at maximum efficiency. The baffles serve to define the pathways along which the water must pass, and serve to even out some of the differences in residence time. Traditionally, baffles provide and define a long/narrow passageway for the water, where, without the baffles, the passageway would have been wide and short.

But baffles are awkward structures to incorporate into a septic tank. If the baffles really are effective to bring all points of the septic tank into equal effect, they will restrict access, and make servicing and cleaning out the tank almost impossible. Plus, the tank is still a tank, even if it contains baffles. And as such, it still requires the heavy lifting equipment, the disruptive excavations, etc, as described. As an example, a 3000-litre traditional (concrete) septic tank may be considered. Such a tank typically requires an excavation that is 2½ by 2½ metres in area, and 2 metres deep. Using the septic-pipe principle (as described herein) instead, the same or better performance can be achieved with a 15 or 20 metre length of 40 cm diameter pipe. A suitable trench for this pipe can soon be excavated, without heavy machinery; and two people can easily pick up 2 or 3-metre sections of 40-cm (plastic) pipe, and instal them in a trench, by hand. Because the volume of the pipe is utilised so effectively, the overall volume of the treatment facility can be reduced. But what can be more important is that the depth of excavation is reduced, and the fact that no crane is needed to install it, especially in difficult and remote areas.

The invention provides another manner by which water can be made to move through a water treatment system, gradually and progressively, the whole body of water moving forwards, with each incoming dose at the inlet end, as an integrated unitary whole body, towards the outlet end.

Again, the aim is to make sure that every drop of water passing through the tank has the same residence time. This aim can be expressed conversely, i.e as the aim to make sure that all of the available space is being utilised equally for the purpose of promoting the treatment reactions and processes.

The invention lies in conducting the wastewater through a septic treatment-pipe, rather than through a septic tank.

The treatment-pipe, has a long/narrow configuration. The narrowness of the cross-section means that substantially all of the cross-section is utilised, more or less equally, for treatment. In a traditional septic tank, as mentioned it does not take long for channels and pathways to start to develop in the tank. Then, the incoming doses of sewage water start to take a short-cut to the outlet, and the rest of the volume of the tank is simply wasted.

As a desideratum, the treatment-pipe and the apparatus should be so configured that, when a dose of sewage enters the inlet, the whole volume of water contained in the apparatus moves forwards towards the outlet, as a unitary moving front, over its whole cross-sectional area. Ideally, every drop of water that emerges from the outlet has been inside the pipe for the same residence time as every other drop. When that is so, the treatment-pipe is at its maximum volumetric efficiency, i.e its efficiency in terms of minimising the water volume that is needed, in the pipe, to achieve full treatment. Of course, the ideal cannot be achieved, wherein all drops of water would have exactly the same residence time; however, the long/narrow treatment-pipe performs much closer to the ideal than a traditionally-shaped septic tank.

The scope of the invention is set out in the accompanying claims, but may be summarised as follows. Excess water in the container drains out of the outlet port, leaving a minimum-standing-body of water retained in the container. This minimum-standing-body of water has a standing-water-length, between the inlet and outlet ports of the container. (In fact, for the sake of clarity of definition, reference is made to an inlet-point and an outlet-point, which are the nearest points within the standing-body to the respective ports.)

At each point along the standing-water-length, the minimum-standing-body of water has a standing-width. At a point-P, the width is standing-width-P. Similar, the standing-body has standing-depth-P at point-P.

Some of the points-P along the standing-water-length comprise also points-TP of the treatment-pipe. A point-P is also a point-TPP if, at point-P, the standing-width-P is less than about ¼ of the standing-water-length. Preferably, the standing-depth-P is also less than ¼ of the standing-water-depth. Any point in respect of which the standing-width at that point is greater than ¼ of the standing-water-length is not a point of the treatment-pipe.

There is also an overall width limitation in respect of the treatment-pipe, that the standing-width should not exceed 120 cm. That is to say, any point-P of the container at which the width does exceed 120 cm is not a point-TPP of the treatment-pipe. Naturally, the wider widths would only be considered in very large installations, but the designer should have it in mind that at widths above 120 cm, freedom from channelling becomes very doubtful. Therefore, the designer should over-engineer the container, bearing in mind that much of the volume might be wasted due to channelling. A septic container is fed from an inlet-pipe which typically is around 15 cm diameter or less, and the designer cannot count on spreading that concentrated in-flow evenly over a larger width than 120. And the smaller the width, the better the assurance that all the width will be utilised equally. Thus, designing to a width limitation of 100 cm provides a good commercial margin. A width limitation of 70 cm means that the possibility of problems with channelling can really be ignored.

The treatment-pipe is the aggregate of all the points-TP, i.e of all the points-P at which the standing-width is less than ¼ of the standing-water-length.

For the treatment-pipe to be long/narrow, in the invention, the treatment-pipe should be at least two metres long. (It should be noted that, for clarity of definition, the narrowness of the treatment-pipe is defined in terms of the ratio of the width of the treatment-pipe to the length of the container, not to the length of the treatment-pipe.)

In a traditional septic tank, with baffles, the overall path as dictated by the baffles may be long/narrow, within the above definition. However, a tank with baffles is not included in the invention, for the reasons as will be described. A tank with baffles is distinguished, in this invention, by the feature that no portion of the wall of the treatment is wetted on both sides by the water undergoing treatment.

DETAILED DESCRIPTION OF PREFERRED EMBODIMENTS

By way of further explanation of the invention, exemplary embodiments of the invention will now be described with reference to the accompanying drawings, in which:

FIG. 1 is a side elevation of a treatment apparatus, installed in the ground, which embodies the invention;

FIG. 2 is a cross-section of a treatment-pipe;

FIG. 3 is a plan view of another treatment apparatus;

Figure 4:
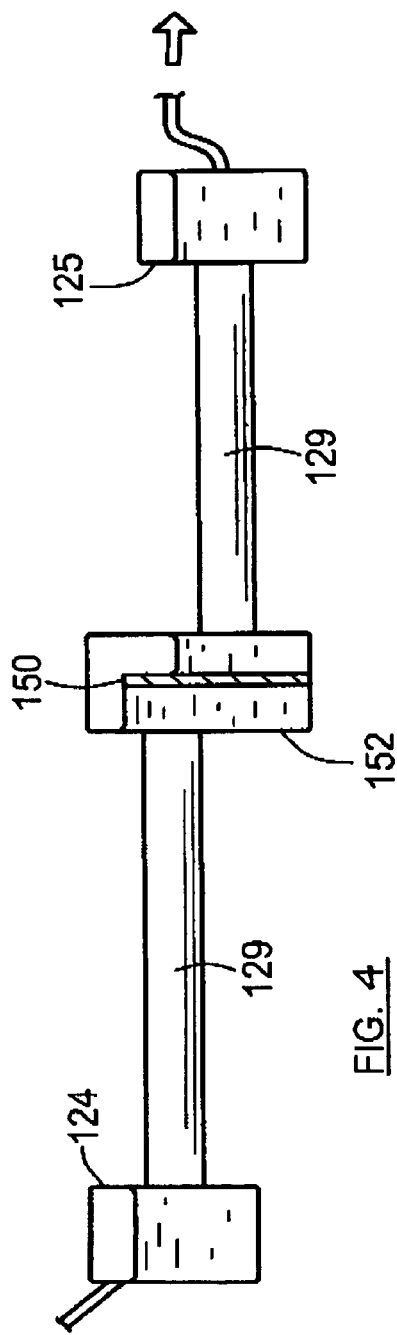
FIG. 4 is a side elevation of a further treatment apparatus.

The apparatuses shown in the accompanying drawings and described below are examples which embody the invention. It should be noted that the scope of the invention is defined by the accompanying claims, and not necessarily by specific features of exemplary embodiments.

The wastewater treatment apparatus 120 shown in FIG. 1 includes an inlet port 123, which receives sewage wastewater from a dwelling, for example a single-family house. The apparatus, to meet the usual codes for e.g a three-bedroom dwelling, should be able to cope with sewage being dosed into the apparatus at the daily rate of 1600 litres per day, being applied at the dose-rate of ten to fifty doses per day, and the following dimensions of the apparatus are set by the need to meet these requirements.

The apparatus 120 includes an inlet chamber 124, which comprises a 1.5 m length of plastic pipe, of diameter 60 cm. The apparatus also includes an outlet chamber 125, which comprises a 1.0 m length of the 60 cm pipe. The chambers are manufactured with holes, having welded or cemented-on flanges and bosses 126, to enable inlet and outlet pipes 127, 128 to be sealingly attached thereto, and to enable a treatment-pipe 129 to be connected between the chambers.

The treatment-pipe 129 is of inexpensive, readily-available, extruded plastic (polyethylene) pipe, having a diameter of 45 cm. The treatment-pipe 129 is 16 m long. (Alternatively, the treatment pipe may be, for example, 60 cm diameter and nine metres long.) An insulative and protective covering of soil, 30 cm deep, lies over the buried treatment-pipe.

The apparatus is installed in a prepared (i.e excavated) receptacle in the ground. At the two ends, the excavation accommodates the inlet and outlet chambers 124,125. Between the ends, a shallow trench, barely 1 m deep, and ½ m wide, is all that is needed to accommodate the treatment-pipe. Of course, heavy excavation equipment may be put to use, if available. But septic treatment apparatus is required in respect of all dwellings, including those where access for heavy equipment is not so easy, and/or the ground is difficult to dig, whereby the minimal excavation requirement is especially beneficial. It is an aim of the invention to treat the water in a pipe or (which includes a conduit or culvert), the mechanical characteristics of which permit the designer to assure mechanical stability when installed to only a shallow depth.

For the purposes of periodic cleaning and other service, the (horizontal) treatment-pipe 129 itself might be difficult to reach. However, usually, most of the heavy solids (sludge 146) will collect in the deposition-sump 148 of the inlet chamber 124. The lighter solids (scum 147) will float on the surface of the water in the inlet-chamber. Access to the inlet-chamber may be had very easily, by means of a removable hatch 130. In fact, a basket may be placed in the inlet-chamber, and the basket simply lifted out, through the hatch 130—sludge, scum, and all—for servicing. Solids can be expected to collect also in the outlet chamber 125, but in smaller quantities.

It is unlikely that there will be much build-up of sludge in the treatment-pipe 129 itself, since the movement of the water along the pipe (slow though that movement is) will tend to carry solids along to the outlet. The pipe 129 may be set at a (slight) angle to the horizontal, if desired, to help prevent build-up actually in the pipe.

Preferably, the treatment-pipe itself is completely filled with water, i.e there is no air, and no access for air, in the treatment-pipe 129. The pipe 129 is the place where the main organic digestion reactions take place, which reduce the C-BOD of the water being treated, and these microbial reactions take place under anaerobic conditions.

Generally, the inlet and outlet chambers should be vented, to make sure there is no build-up of pressure (or vacuum) inside. The venting may be done via the inlet pipe 127, to a venting stack on the roof of the dwelling, to control odours etc. If the layout of the pipe permits a small airspace on top of the water in the pipe, that is not too important (cf. the airspace above the water in a traditional septic tank), but still the water in the treatment pipe must not be allowed to become aerated, again as in a traditional system. Water undergoing septic breakdown reactions in the treatment pipe should remain substantially still, except for the occasional shifts due to fresh doses of wastewater being added at the inlet.

Major benefits of the invention include the fact that the long/narrow pipe-configuration is excellent at preventing pathways from arising. As a result, all portions of the volume of the treatment-pipe contribute equally to overall treatment performance. Also, the excavated hole in the ground, as needed to accommodate the treatment-pipe, can be done with considerably less expense and disruption than the corresponding excavation needed to accommodate a traditional septic tank.

For the purposes of the invention, the difference between a long/narrow treatment-pipe, as used in the invention, and the long/narrow conduit that arises from the placement of baffles in a conventional septic tank, is that a baffle is a wall that is wetted on both sides by the wastewater undergoing septic treatment. In the treatment-pipe, the walls of the treatment-pipe are wetted by the wastewater only on the inside. The outside surface of the treatment-pipe wall is in contact with air, or with the ground in which the pipe is buried. (The ground might be saturated with water, but that is other water, i.e not the wastewater undergoing treatment.) The traditional septic tank is a large heavy cumbersome structure, and requires a substantial and expensive excavation, and the use of heavy equipment, for its installation. Even then, such structures are fragile, in the sense that the tank can crack, or even collapse, for example if the ground should settle, etc. In the present case, however, the septic container, as a complete unit, has a long/narrow configuration; that configuration means that the overall unit has very high integrity, as a structure. This may be contrasted with a traditional septic tank, in which the treatment path has been elongated by placing baffles inside the tank; the provision of baffles (baffles are wetted on both sides by the water undergoing treatment) does not nothing to change the physical requirements and structural integrity of what is still a short wide tank.

As may be understood from FIG. 1, when water enters the inlet port 123, the volume of water in the apparatus increases, and the level of the water tends to rise, thereby causing excess water to flow out from the outlet port 132. Water drains out of the outlet port, until only a minimum-standing-body of water remains in the apparatus. The level of the minimum-standing-body, and thus the volume of the minimum-standing-body, is defined by the height of the weir 134 at the outlet port 132. The water remains at this level until the next dose of wastewater enters at the inlet port.

FIGS. 1 and 2 illustrate how the dimensions that are important in the definition of the invention (and especially in defining the long/narrow aspect of the invention) are determined. At the inlet end, an inlet-point 135 is established, as the point on the surface of the minimum-standing-body of water which is the closest point to the inlet port. Correspondingly, an outlet-point 136 is the point on the surface of the minimum-standing-body of water which is the closest point to the outlet port. A line is drawn, through the wastewater undergoing treatment, along the shortest route between these two points 135, 136. This line is termed the standing-body-length 137.

At each point along the length of the standing-body-length 137, the water has a standing-body-width 138. The standing-body-width is the overall width of the wastewater at that point. Usually, this width will be equal to the maximum horizontal distance apart of the inside-surfaces of the walls of the pipe, at that point. The standing-body-width is the widest width of the water at the point, which may occur at any depth of the water at that point.

FIG. 2 is a cross section of the treatment-pipe 129 taken at a particular point along the standing-body-length 137. The standing-body-width is the maximum internal (horizontal) width of the pipe. The depth at which the standing-body-width occurs is the depth at which the standing-body-width is maximum.

The standing-body-width 138 would not be the width of the surface of the water unless the width of the surface happens to coincide with the maximum distance apart of the pipe walls. Besides, the water need not have a surface at all, over much of the standing-body-length.

The depth 139 of the water is a vertical measurement. The depth is affected by whether there is an airspace 140 above the water.

Point P1 is a point on the inwards-facing-surface 142 of the pipe wall 143, and is a point on that surface that is wetted by the minimum-standing-body of wastewater that is undergoing treatment in the treatment-pipe. Point Q1 is a point on the outwards-facing-surface 145 of the pipe wall, being the closest point on the outwards-facing-surface from point P1, and is separated therefrom by the thickness T1 of the pipe wall at that point. Point Q1 is not wetted by the minimum-standing-body of wastewater undergoing treatment in the treatment-pipe.

This condition (of not being wetted on the outwards-facing-surface) is not true of a baffle. A baffle is, by definition, wet on both sides. In the invention, no portion of the treatment-pipe wall 43 is wetted on both sides by the water undergoing treatment. No portion of the wall of the treatment-pipe doubles as another portion of the wall of the treatment-pipe. The treatment-pipe is of long/narrow configuration, to ensure efficiency of usage, and the long/narrow configuration is achieved, not by putting baffles in a short wide tank, but by providing a structure that is itself physically long and narrow, i.e the treatment-pipe.

The long/narrow configuration is preferably defined by the following dimensional parameters of the treatment-pipe:
(a) the standing-body-length 137 is at least four metres;
(b) the volume of the minimum-standing-body is at least 1.5 cubic metres;
(c) referring to at least fifty percent of the points along the standing-body-length, both the standing-body-width 138 at that point, and the depth of the water at that point, are less than one quarter of the standing-body-length 37.

These dimensional limitations will now be explained.

Traditionally, the smallest size of septic tanks have had a capacity of around 2 cubic metres, which is the size appropriate to (and fulfilling the codes for) a small single-family dwelling. Because the treatment-pipe utilises its volume and capacity so very efficiently, an equivalent degree of treatment can be realised, with a treatment-pipe, of about 1.2 or 1.5 cubic metres.

The "long" aspect of the long/narrow configuration of the treatment-pipe is determined by the limitation that the standing-body-length 137 preferably should be at least four metres.

The "narrow" aspect of the long/narrow configuration is determined by the limitation that the treatment-pipe have a width 138 of, preferably, less than sixty centimetres. The narrowness requirement applies to the treatment pipe portion of the apparatus, not to the end-chambers, which may be wider. But the end-chambers should not account for more than fifty percent of the standing-body-length. At this, it is easy to ensure that no pathways develop in the pipe. The wider the pipe, the more possible it is for unwanted pathways to develop, and for the structure thereby to become inefficient. If the treatment-pipe were to have a width of more than about one quarter of the standing-body-length, the development of unwanted pathways, over a period of time, would be more or less inevitable.

The treatment-pipe should not be so narrow that the water shoots along it at a high velocity, of course, given that motion of the water is not conducive to efficient settling-out of solid debris. A practical lower limit to the narrowness of the standing-body-width 138 would be around twenty-five centimetres; below that, the water would probably be moving too quickly.

It is not essential that the whole minimum-standing-body of water be contained actually in the treatment-pipe. As shown in FIG. 1, some of the water is contained in the inlet and outlet chambers 124,125.

The structure of FIG. 1, i.e the treatment-pipe 129 and the two chambers 124, 125, may be pre-fabricated and pre-assembled, as an integrated whole unit, prior to being taken to the site. Alternatively, the final insertion of the pipe 129 into the (factory-formed) flanges 126 in the chambers may be left, to be completed upon installation at the site. In that case, the ease with which the unassembled components can be handled and transported must be set against the difficulty of ensuring, on site, that the seal between the pipe and the chambers is done properly.

Alternatively, the inlet and outlet pipes 127,128 may be coupled directly into the ends of the treatment-pipe, i.e the inlet and outlet chambers 124,125 may be omitted, as separate structures. However, it is more convenient for the manufacturer to make the inlet and outlet chambers as standard components, and then the treatment-pipe 129 is simply a length of standard cylindrical pipe, having no attachment structures fabricated into it. Then, the length of the pipe is the only variable, installation to installation. The presence of the chambers 124,125, with their openable hatches 130, means that the settled-out sludge and scum can be easily accessed, and removed. Easy access is especially important for the inlet chamber 124, since the sludge tends to settle out mainly near the inlet end.

However, the end-chambers should be regarded as being adjuncts to the treatment-pipe. A substantial proportion of the volume of the minimum-standing-body of water undergoing treatment must be contained in the long/narrow structure of the apparatus, i.e in the treatment-pipe. That is to say, at least one half of the volume of the minimum-standing-body of water should be contained within the treatment-pipe itself. If the inlet and outlet chambers were to contain more than one-half of the total volume of the minimum-standing-body, that would mean the chambers were too large, which would be an inefficient utilisation of the available space, and which would lead to the development of unwanted pathways.

Expressed as a linear dimension of the standing-water-length 137, preferably at least fifty percent of the standing-water-length should lie within the treatment-pipe 29 itself. Preferably, the treatment-pipe accounts for three-quarters of the standing-water-length.

It is repeated that the treatment-pipe is the long/narrow portion of the apparatus, over which the standing-body-width is less than one quarter of the standing-body-length. Up to half of the total volume of the minimum-standing-body of water may be contained elsewhere than in the treatment-pipe, where the long/narrow limitation does not apply.

The inlet chamber preferably is deeper than the outlet chamber (and than the middle chamber), because it is the inlet chamber that collects most of the settled-out solid sludge. However, if the lie of the land is especially difficult, it may be easier to excavate a deeper hole for the outlet-chamber or for the middle-chamber than for the inlet-chamber. In that case, the outlet or middle chamber may be lengthened (i.e deepened) appropriately, and the main collection of sludge would then occur in that chamber. One of the benefits of the treatment-pipe apparatus is that, if the inlet chamber is shallow, whereby its floor is quickly covered with sludge, it is unlikely that sludge will then build up actually in the treatment-pipe, due to the (periodic) movement of water in the treatment-pipe. Of course, when the inlet chamber is shallow, the prudent owner will monitor the apparatus more closely, to make sure the treatment-pipe is not starting to become blocked with sludge.

The designer should prefer the inlet and outlet chambers to be small, to minimise the amount of extra excavation (i.e extra to the trench that will house the treatment-pipe). The main benefit of the invention comes from the presence of the treatment-pipe, rather than from the presence of the inlet and outlet chambers. One, or both, chambers, as separately-manufactured structures, may be omitted. Again, the water contained in the chambers should not comprise more than half the total volume of the whole minimum-standing-body.

The treatment-pipe 129 preferably is a length of extruded round plastic pipe. However, other forms are contemplated, although the convenience is preferred, of containing the water in an actual physical pipe, with its constant-thickness cylindrical walls, and inexpensive, easily available, but assured, integrity.

When the treatment-pipe is long, it may be in sections. The sections may be joined by such means as bolted-together flanges, or an enlarged end on one of the sections which slides over the plain end of the adjacent section, etc.

The treatment apparatus may be arranged with more than one treatment-pipe. When two or more treatment-pipes are used, they may be arranged in series. An example of an apparatus with two pipes in series, where the two pipes lie both at the same level, is shown in FIG. 3.

Putting two pipes in series can be done where, for example, the lie of the land dictates a major change of direction. In FIG. 3, a middle chamber 149 is provided, between the first and second pipes. While this middle chamber can be of some use for collecting settled-out solids, its main purpose is simply to provide a physical structure into which the ends of the treatment-pipes can be mounted and sealed.

An example of en apparatus with two pipes in series, where the two pipes lie at different levels, is shown in FIG. 4. The water level in the second pipe is lower than that in the first pipe, due to the presence of the weir 150 in the middle chamber 152. Thus, the minimum-standing-body of water need not be in one coherently-unitary body, having all the same surface level. However, a change in level might give rise to some aeration of the water, which might affect the efficiency of the anaerobic reactions, so preferably the minimum-standing-body should be a coherent, unitary body of water, unless that is impossible due to the lie of the land.

Figure 5:
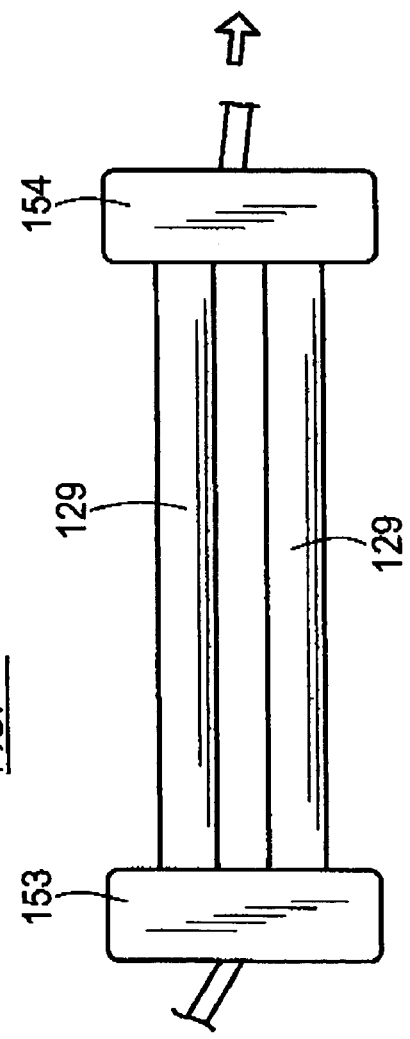
FIG. 5 is a plan view of another treatment apparatus.

An example of an apparatus with two treatment-pipes in parallel is shown in FIG. 5. This can be done, again, when the ground is very difficult, and deep excavation must be kept to a minimum. Both pipes use a common inlet chamber 153 and a common outlet chamber 154. Where two (or more) pipes are used, the designer preferably should arrange the inlet and outlet chambers such that neither one of the pipes receives more flow than the others. Thus, it would not be preferred, in the invention, to provide two or more treatment-pipes, where the pipes were substantially different as to size, flow-rate, etc. The designer preferably should see to it that the residence time of the water is the same, whichever treatment-pipe the water passes through.

In the parallel treatment-pipes version, the parallel-pipes should be fed from a common entry-chamber. The parallel-pipes need not all drain into a common outlet chamber; however, it should be noted that if the parallel pipes have separate outlet ports, the water in all the pipes will drain down to the level of the lowest port; thus, a common outlet chamber, with one single outlet pipe, is also preferred.

It should be noted that the treatment apparatus as described herein, regarding the invention, is intended only for promoting the anaerobic digestion reactions. After having passed through the anaerobic treatment stage, in the treatment-pipe, the water has to be aerated, to promote the needed aerobic treatment reactions. The aerobic treatment station is not included in the invention, and the treatment-pipe, as described in the invention, cannot, by definition, be a part of the aerobic treatment station.

In a case where the treatment apparatus has to accommodate a greater dose rate of incoming sewage, the treatment-pipe length may be increased. But there is no need to increase the other dimensions of the apparatus. Thus, capacity may be increased, up to a dose-rate of around 15,000 litres per day, simply by increasing the length of the 45 cm diameter pipe, for instance to twenty metres. In respect of the minimum-standing-body of water, the designer should aim for four-to-one, or greater, in respect of the ratio of the standing-body-length to the standing-body-width, at more than half the points along the standing-body-length.

Below four-to-one, the septic treatment-pipe would not have the required long/narrow configuration; rather, it would now be characterised as a short/wide container, like a traditional septic tank; and as such it would be prone to the channelling of unwanted pathways. Also, the short/wide container does not have the mechanical structural integrity of a long/narrow or pipe. Although four-to-one is the limit, about six-to-one should be regarded as the working limit, to be used in practice, as giving a reasonable commercial margin of tolerance. Above about eight-to-one, diminishing returns can be expected, i.e the freedom from unwanted channelling is almost completely assured at about eight-to-one. If more volume is required, tough, it is preferred to add volume by way of extra length, rather than extra width, though the designer should take care that the water does not travel along the treatment-pipe at too high a velocity.

As described, the invention is particularly applicable for use in domestic installations, either for one house, of for a small number of houses that share wastewater treatment, or for small institutional installations, having a dose rate up to about 15,000 litres per day. In these installations, the septic treatment is followed by the usual aerobic treatment, and then the water is infiltrated into the ground, at or close to the treatment station(s). The water is not piped away (or not piped for any great distance), either before or after passing through the anaerobic and aerobic treatment station(s). In these cases, apart from the plumbing pipes in the house, the treatment-pipe itself comprises almost the only length of pipe in the system. However, it is not a limitation of the invention that the water not be piped away.

For a one-bedroom house (750 litres per day), a five or six metre run of 45-cm pipe (with suitable end-chambers) would be suitable; so would two five or six metre runs of 30-cm pipe. For a four-bedroom house (2,500 litres per day) nine or ten metres of 60-cm pipe, plus end-chambers, would be suitable.

The invention is not so applicable to large installations, e.g installations that cater for dozens of domestic homes, or for larger public institutions, or municipal water treatment installations, because there, usually, the savings arising from the minimal excavations, and from the easy assurance of mechanical stability, would be less. This is not to say that the invention must be ruled out in respect of large installations, and indeed especially the parallel-pipe configuration of FIG. 5 can lend itself well to large installations. But rather, the invention especially lends itself to the type of housing development where each house has its own individual water treatment station, or each set of four or five houses.

Notionally, the dimensions of the apparatus could be reduced, if the dosing were less than 1000 litres per day; but in practice, treatment systems are hardly ever designed for dosing rates of less than 1000 litres per day.

If the desired average residence time for water passing through the system were one day, the minimum standing volume should be equal to one day's dosage. But the average residence time should not be set as low as one day, since that would leave too small a margin for variations. Rather, the designer should provide that the minimum-standing-body of water has a volume of preferably one-and-a-half times, and a minimum of one-and-a-quarter times, the average daily dose rate. Thus, where the dose rate is 3,000 litres per day, the volume of the minimum-standing-body preferably should be 4,500 litres. As mentioned, keeping the width and depth of the minimum-standing-body below one quarter of the standing-body-length, over at least half of the standing-body-length, enables freedom from unwanted pathways. A treatment-pipe less than one metre diameter is suitable for installations dealing with up to about 15,000 litres per day, in that differences in residence time can be accommodated by using different lengths of treatment pipe.

However, for installations that deal with more than about 15,000 litres per day, the diameter of the treatment pipe should be increased beyond the one metre, because at that large flow rate, a one-metre pipe would be too narrow, in that the water would be flowing along the pipe at too high a velocity. Therefore, for large flow rates, the diameter of the pipe should be increased to a dimension that enables the water, again, to move only very slowly.

As mentioned, the apparatus should be engineered such that the volume of the minimum-standing body is 1¼ to 1½ times the average daily dosing rate. If the designer specifies a smaller volume than that, there may not be enough margin to cater for the inevitable variations in usage. If the designer specifies a greater volume, the system may be utilising the available space in an inefficient manner. It may be noted that the cost of returning later to increase the capacity of a too-small treatment-pipe system is considerably less than the cost of returning later to increase the capacity of a too-small concrete tank system. So, with a concrete tank, the prudent designer makes sure to over-engineer the system; but with the treatment-pipe, the designer can leave less of a margin.

It should be understood that the treatment-pipe of the invention is a deliberately engineered containment structure. It might be considered that, sometimes, a treatment-pipe system, like that described herein, might have arisen accidentally, for example when a sewage pipe became (partially) blocked, causing water to be backed up, and the backed-up pool of water might correspond to the minimum-standing-body of water. Indeed, the water in such a pool might undergo some anaerobic treatment. The treatment-pipe of the invention lies in the engineered structure that sets the minimum-standing-body of water, as described; the invention does not lie in the body of water itself.

Where the wastewater is fairly clear of suspended solids, for instance where the treatment-pipe station receives water that has passed through a pre-treatment station, the treatment-pipe can contain a filter medium. The purpose of the filter medium is to encourage attached microbial growth and to enhance treatment. The medium should have good permeability and porosity, while maximizing surface area. A mat of thin plastic strips, for example, is very suitable. Preferably, the medium should be removable from one end of the treatment-pipe, for occasional servicing. The medium must be made from a non-biodegradable material that will attract microbes, such as polyethylene, polyurethane, rock wool; but not material that will absorb water and weaken, like nylon; nor repel microbes, like styrene-type.

In connection with the septic treatment-pipe, an alternative to placing the treatment pipe in a predominantly horizontal configuration, as depicted herein, is to align the treatment pipe vertically, or nearly vertically. The treatment-pipe can be in two sections, one conveying the water downwards, followed by another which conveys the water back up. This arrangement can be made to perform efficiently, and be economical, if the lie of the land requires it.

In a preferred option wastewater is treated first in a septic treatment pipe, as described herein, and then passes to a second treatment pipe, containing the described treatment material. Thus the wastewater is treated both anaerobically and aerobically in the respective treatment pipes.

The invention claimed is:
1. A container for treating wastewater, wherein:
the container includes an inlet port for receiving wastewater to be treated, and an outlet port;
the arrangement of the container is such that, when water enters the inlet port, the level of water in the container tends to rise, thereby causing excess water to flow out from the outlet port;
the container is so arranged that water drains out of the outlet port, down to a minimum-standing-body of water which is retained in the container;
the minimum-standing-body of water has a standing-inlet-point and a standing-outlet-point, which are the closest points on the surface of the minimum-standing-body of water to the inlet port and the outlet port respectively;
the minimum-standing-body of water has a standing-water-length, which is the length of the shortest line through the minimum-standing-body, between the standing-inlet-point and the standing-outlet-point;
the container includes left and right side-walls;
the left and right side-walls have respective inwards-facing surfaces and outwards-facing-surfaces;
the inwards-facing-surfaces define a hollow interior of the container, in which the minimum-standing-body of water is contained, and which are in direct wetted contact with the minimum-standing-body of water;
at each point-P along the standing-water-length of water in the container, the container has a respective standing-water-width-P associated therewith;
the standing-water-width-P is the width overall of the minimum-standing-body of water at the point-P, as measured between the inwards-facing side-surfaces of the left and right side-walls of the container at point-P;
the container includes a treatment-pipe, which is of a long/narrow configuration;
the treatment-pipe is a component of the container, and is so arranged that wastewater, in passing from the inlet port to the outlet port of the container, passes along and through the treatment-pipe;
each point-P along the standing-water-length comprises also a point-TP of the standing-water-length if:—
(a) the standing-water-width-P at that point is less than about 120 cm; and
(b) the standing-water-width-P at that point is less than about ¼ the standing-water-length;
the treatment-pipe comprises the aggregate of all the points-T of the container;
the line of the standing-water-length passes through the treatment-pipe, and the treatment-pipe has a pipe-length, which is the length of that portion of the line of the standing-water-length that lies within the treatment-pipe;
the pipe-length is at least two meters;
portions of the left and right side-walls of the container that lie in the treatment-pipe comprise left and right pipe-side-walls, having respective inwards-facing and outwards-facing side surfaces;
the treatment-pipe is structurally isolated, in that:—
(a) no portion of the left and right pipe-side-walls is wetted on both side-surfaces thereof by the minimum-standing-body of water; and
(b) all points on the outwards-facing side-surfaces of the left and right pipe-side-walls lie wholly outside the treatment-pipe, in that all the said points on the outwards-facing side-surfaces are not wetted by the minimum-standing-body of water;

the wastewater entering the minimum-standing-body comprises sewage;

the arrangement of the container is such that wastewater entering the minimum-standing-body undergoes anaerobic treatment reactions, and remains in the container long enough that the water exiting from the outlet port has undergone substantially complete septic treatment;

the structure of the container is such that the wastewater, in passing from the inlet point to the outlet point, has substantially no opportunity to become aerated;

the treatment-pipe also includes a floor and a roof, which make the treatment-pipe circumferentially complete, having respective inwards-facing and outwards-facing surfaces, and all the points on the outwards-facing surfaces of the floor and roof lie wholly outside the treatment-pipe, in that all the said points are not wetted by the minimum-standing-body of water in the treatment-pipe;

the container includes an inlet chamber, which contains the inlet-port;

the treatment-pipe is sealingly attached to the inlet chamber, and is in liquid-transfer-communication therewith;

the structure of the container is such that there is substantially no airspace above the portion of the minimum-standing-body of water that lies within the treatment-pipe.

2. Container of claim 1, wherein the minimum-standing-body of water retained in the container has a volume of at least about 1200 litres.

3. Container of claim 1, wherein the treatment-pipe is structurally isolated, in that:

the pipe-side-walls comprise a sheet of impermeable material;

the inwards-facing side-surface and the outwards-facing side-surface comprise opposed surfaces of the sheet of material, and the sheet of material is solid as to its thickness between the two surfaces;

all the points on the inwards-facing side-surface that are wetted by the minimum-standing-body are designated respectively points P1, P2, . . . , PN;

in respect of all the points P1, P2, . . . , PN on the inwards-facing side-surface, the sheet of material has a respective thickness T1, T2, . . . , TN mm;

all the points P1, P2, . . . , PN on the inwards-facing side-surface correspond to respective points Q1, Q2, . . . , QN which lie on the outwards-facing side-surface of the pipe-side-wall, the points P1, P2, . . . , PN being spaced respectively T1, T2, . . . , TN mm from the points Q1, Q2, . . . , QN;

all points Q1, Q2, . . . , QN on the outwards-facing side-surface of the pipe-side-wall lie wholly outside the treatment-pipe, in that all the said points Q1, Q2, . . . , QN are not wetted by the minimum-standing-body of water in the treatment-pipe.

4. Container of claim 1, wherein the line comprising the standing-surface-length is continuous and uninterrupted, between the standing-inlet-point and the standing-outlet-point.

5. Container of claim 4, wherein:

the container includes only one treatment-pipe, in that the container is so arranged that there is no pathway that wastewater, having entered through the inlet port, could take, which does not pass through the said treatment-pipe;

the surface of the minimum-standing-body of water is continuous and all at a single level, between the inlet port and the outlet port;

the pipe-length of the one treatment-pipe is at least four metres.

6. Container of claim 1, wherein:

the treatment-pipe comprises two series-pipes, arranged in series;

the surface of the minimum-standing-body of water is on two levels respectively in the series-pipes;

and the apparatus includes means for transferring water between the levels.

7. Container of claim 6, wherein the means for transferring water between the levels is one of (a) a gravity-weir, or (b) an electric pump.

8. Container of claim 1, wherein:

the container includes two or more parallel-pipes, of which the said treatment-pipe is one;

the container includes an entry-chamber, common to all the parallel-pipes, which is so arranged that water entering the container passes into and through the common entry-chamber before entering the parallel-pipes;

the parallel-pipes are arranged each to conduct water away from the common entry-chamber;

each parallel-pipe has a respective parallel-standing-water-length, which is the length of the shortest line through the minimum-standing-body, between the standing-inlet-point and the standing outlet-point, and passing though the water in that parallel-pipe;

the parallel-pipes have respective parallel-pipe-lengths, being those portions of the respective parallel-standing-water-lengths that lie within the respective parallel-pipes;

the parallel-pipes have respective left and right parallel-pipe-side-walls;

in respect of each parallel-pipe:
the parallel-pipe-length is at least two metres;
at each point along the parallel-pipe-length, the parallel-pipe has a parallel-pipe-width;
at each point along the parallel-pipe-length, the parallel-pipe-width is less than ¼ of the parallel-pipe-length;

the arrangement of the container is such that the residence time of water in all the parallel-pipes is substantially the same.

9. Container of claim 8, wherein the container includes an exit-chamber, common to all the parallel-pipes, which is so arranged that all water emanating from all the sub-pipes passes into the common exit-chamber, and the outlet port of the container comprises the entry-mouth of a single outlet-pipe.

10. Container of claim 1, wherein:

the standing-water-length is not more than the pipe-length plus three metres; or the standing-water-length is not more than one-and-a-half times the pipe-length-TL.

11. Container of claim 1, wherein, at each point-TP along the pipe-length, the minimum-standing-body of water at that point has a respective standing-water-depth-T, which is less than about ¼ the standing-water-length.

12. Container of claim 1, wherein each point-P along the standing-water-length comprises also a point-TP of the standing-water-length only if the standing-water-width-P at that point is less than about 100 cm.

13. Container of claim 12, wherein each point-P along the standing-water-length comprises also a point-TP of the standing-water-length only if the standing-water-width-P at that point is less than about 70 cm.

14. Container of claim 1, wherein each point-P along the standing-water-length comprises also a point-TP of the standing-water-length only if the standing-water-width-P at that point is less than about ⅙ the standing-water-length.

15. Container of claim 14, wherein each point-P along the standing-water-length comprises also a point-TP of the standing-water-length only if the standing-water-width-P at that point is less than about ⅛ the standing-water-length.

16. Container of claim 1, wherein, once it has entered the treatment-pipe, the water is confined by the pipe-side-walls, and continues to the end of the pipe.

17. Container of claim 16, wherein:
the treatment-pipe is structurally isolated, in that:
no portion of the pipe-side-walls is wetted on both side-surfaces thereof by the minimum-standing-body of water;
all points on the outwards-facing side-surfaces of the pipe-side-walls lie wholly outside the treatment-pipe, in that all the said points on the outwards-facing side-surfaces are not wetted by the minimum-standing-body of water.

18. Container of claim 17, wherein the inwards-facing surfaces of the pipe-side-walls are smooth and uninterrupted lengthwise of the treatment-pipe, whereby substantially no pockets of water can collect, and be retained.

19. Container of claim 17, wherein;
the container includes an outlet chamber, and the outlet chamber contains the outlet-port;
the treatment-pipe is sealingly attached to the outlet-chamber, and is in liquid-transfer-communication therewith.

20. Container of claim 17, wherein the treatment-pipes comprise two treatment-pipes, and the container includes a middle chamber, sealingly connected between the two treatment-pipes.

21. Container of claim 1, wherein the treatment-pipe is circumferentially continuous, and has the same cross-sectional size and configuration, at all points along its length.

22. Container of claim 21, wherein the treatment-pipe is right-cylindrical.

23. Container of claim 1, wherein the inlet chamber includes a deposition-sump, which is so arranged, as to its depth and location in the inlet chamber, that a portion of the water comprising the minimum-standing-body and residing in the inlet chamber remains still enough to enable sediment present in the water to settle out into the deposition-sump.

24. Container of claim 1, wherein the treatment-pipe includes a body of a filter medium, which is so structured as to promote the attachment of microbes thereto.

25. Container of claim 1, wherein the wastewater comprises sewage-water from a human habitation.

26. Container of claim 25, wherein the apparatus is so sized and arranged as to be suitable for treating the sewage effluent from a single domestic dwelling, or from a small number of domestic dwellings.

27. The combination of a container of claim 25 with a dwelling having N bedrooms, wherein the volume of the minimum-standing-body of water retained in the container is N times 500 litres.

28. Container of claim 1, wherein the arrangement of the container is such that the wastewater remains in the container, on an average flow basis, for at least half a day.

* * * * *